(12) United States Patent
Taherzadeh Boroujeni et al.

(10) Patent No.: US 11,658,728 B2
(45) Date of Patent: May 23, 2023

(54) REPORTING DATA INDICATING CONDITIONS SIMILAR TO A PAST EVENT

(71) Applicant: QUALCOMM Incorporated, San Diego, CA (US)

(72) Inventors: Mahmoud Taherzadeh Boroujeni, San Diego, CA (US); Tao Luo, San Diego, CA (US); Juan Montojo, San Diego, CA (US); Peter Gaal, San Diego, CA (US); Junyi Li, Fairless Hills, PA (US); Xiaoxia Zhang, San Diego, CA (US); Wooseok Nam, San Diego, CA (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 119 days.

(21) Appl. No.: 17/305,914

(22) Filed: Jul. 16, 2021

(65) Prior Publication Data

US 2023/0020323 A1 Jan. 19, 2023

(51) Int. Cl.
*H04L 5/00* (2006.01)
*H04B 7/08* (2006.01)
*H04B 17/336* (2015.01)
*H04W 24/10* (2009.01)
*H04W 76/19* (2018.01)

(52) U.S. Cl.
CPC ........... *H04B 7/088* (2013.01); *H04B 17/336* (2015.01); *H04W 24/10* (2013.01); *H04W 76/19* (2018.02)

(58) Field of Classification Search
CPC ......................... H04L 5/005; H04W 72/1268
See application file for complete search history.

(56) References Cited

U.S. PATENT DOCUMENTS

2018/0035322 A1\* 2/2018 Yamine ................. H04W 24/10

\* cited by examiner

*Primary Examiner* — Zhiren Qin
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, configuration information specifying similarity data to be provided in a Layer 1 (L1) report. The UE may transmit, to the base station and based at least in part on receiving the configuration information, the L1 report. The L1 report indicates a measure of similarity between a current condition of the UE and a past condition of the UE associated with a past event associated with the UE. Numerous other aspects are described.

30 Claims, 8 Drawing Sheets

REPORTING DATA INDICATING CONDITIONS SIMILAR TO A PAST EVENT

INTRODUCTION

Aspects of the present disclosure generally relate to wireless communication and to techniques and apparatuses for reporting data indicating conditions similar to a past event.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, from a base station, configuration information specifying similarity data to be provided in a Layer 1 (L1) report. The method may include transmitting, to the base station and based at least in part on receiving the configuration information, the L1 report. The L1 report indicates a measure of similarity between a current condition of the UE and a past condition of the UE associated with a past event associated with the UE.

Some aspects described herein relate to a method of wireless communication performed by a base station. The method may include transmitting, to a UE, configuration information specifying similarity data to be provided in an L1 report. The method may include receiving, from the UE and based at least in part on transmitting the configuration information, the L1 report. The L1 report indicates a measure of similarity between a current condition of the UE and a past condition of the UE associated with a past event associated with the UE.

Some aspects described herein relate to a UE for wireless communication. The user equipment may include a memory and one or more processors coupled to the memory. The one or more processors may be configured to receive, from a base station, configuration information specifying similarity data to be provided in an L1 report. The one or more processors may be configured to transmit, to the base station and based at least in part on receiving the configuration information, the L1 report.

Some aspects described herein relate to a base station for wireless communication. The base station may include a memory and one or more processors coupled to the memory. The one or more processors may be configured to transmit, to a UE, configuration information specifying similarity data to be provided in an L1 report. The one or more processors may be configured to receive, from the UE and based at least in part on transmitting the configuration information, the L1 report.

Some aspects described herein relate to a non-transitory computer-readable medium that stores a set of instructions for wireless communication by a UE. The set of instructions, when executed by one or more processors of the UE, may cause the UE to receive, from a base station, configuration information specifying similarity data to be provided in an L1 report. The set of instructions, when executed by one or more processors of the UE, may cause the UE to transmit, to the base station and based at least in part on receiving the configuration information, the L1 report.

Some aspects described herein relate to a non-transitory computer-readable medium that stores a set of instructions for wireless communication by a base station. The set of instructions, when executed by one or more processors of the base station, may cause the base station to transmit, to UE, configuration information specifying similarity data to be provided in an L1 report. The set of instructions, when executed by one or more processors of the base station, may cause the base station to receive, from the UE and based at least in part on transmitting the configuration information, the L1 report.

Some aspects described herein relate to an apparatus for wireless communication. The apparatus may include means for receiving, from a base station, configuration information specifying similarity data to be provided in an L1 report. The apparatus may include means for transmitting, to the base station and based at least in part on receiving the configuration information, the L1 report. The L1 report indicates a measure of similarity between a current condition of the UE and a past condition of the UE associated with a past event associated with the UE.

Some aspects described herein relate to an apparatus for wireless communication. The apparatus may include means for transmitting, to a UE, configuration information specifying similarity data to be provided in an L1 report. The apparatus may include means for receiving, from the UE and based at least in part on transmitting the configuration information, the L1 report. The L1 report indicates a measure of similarity between a current condition of the UE and a past condition of the UE associated with a past event associated with the UE.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 8 and 9 are diagrams of an example apparatuses for wireless communication.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
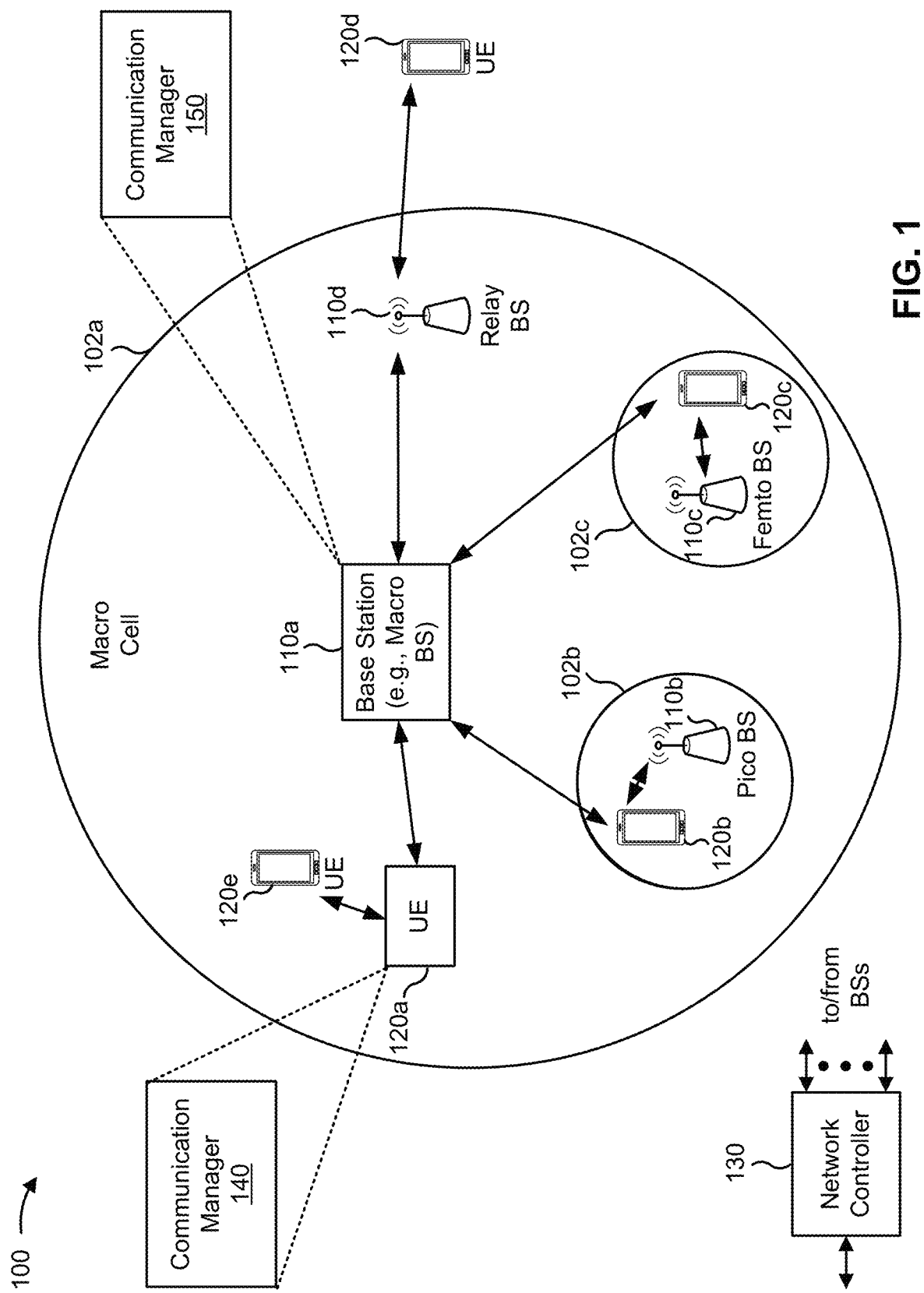
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a UE 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

The electromagnetic spectrum is often subdivided, by frequency/wavelength, into various classes, bands, channels, etc. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a base station, configuration information specifying similarity data to be provided in an L1 report; and transmit, to the base station and based at least in part on receiving the configuration information, the L1 report. The L1 report indicates a measure of similarity between a current condition of the UE and a past condition of the UE associated with a past event associated with the UE. Additionally, or alternatively, the communication manager 140 may perform one or more other operations described herein.

In some aspects, the base station 110 may include a communication manager 150. As described in more detail elsewhere herein, the communication manager 150 may transmit, to a UE, configuration information specifying similarity data to be provided in an L1 report; and receive, from the UE and based at least in part on transmitting the configuration information, the L1 report. The L1 report indicates a measure of similarity between a current condition of the UE and a past condition of the UE associated with a past event associated with the UE. Additionally, or alternatively, the communication manager 150 may perform one or more other operations described herein.

As indicated above, FIG. 1 is provided as an example. Other examples may differ from what is described with regard to FIG. 1.

Figure 2:
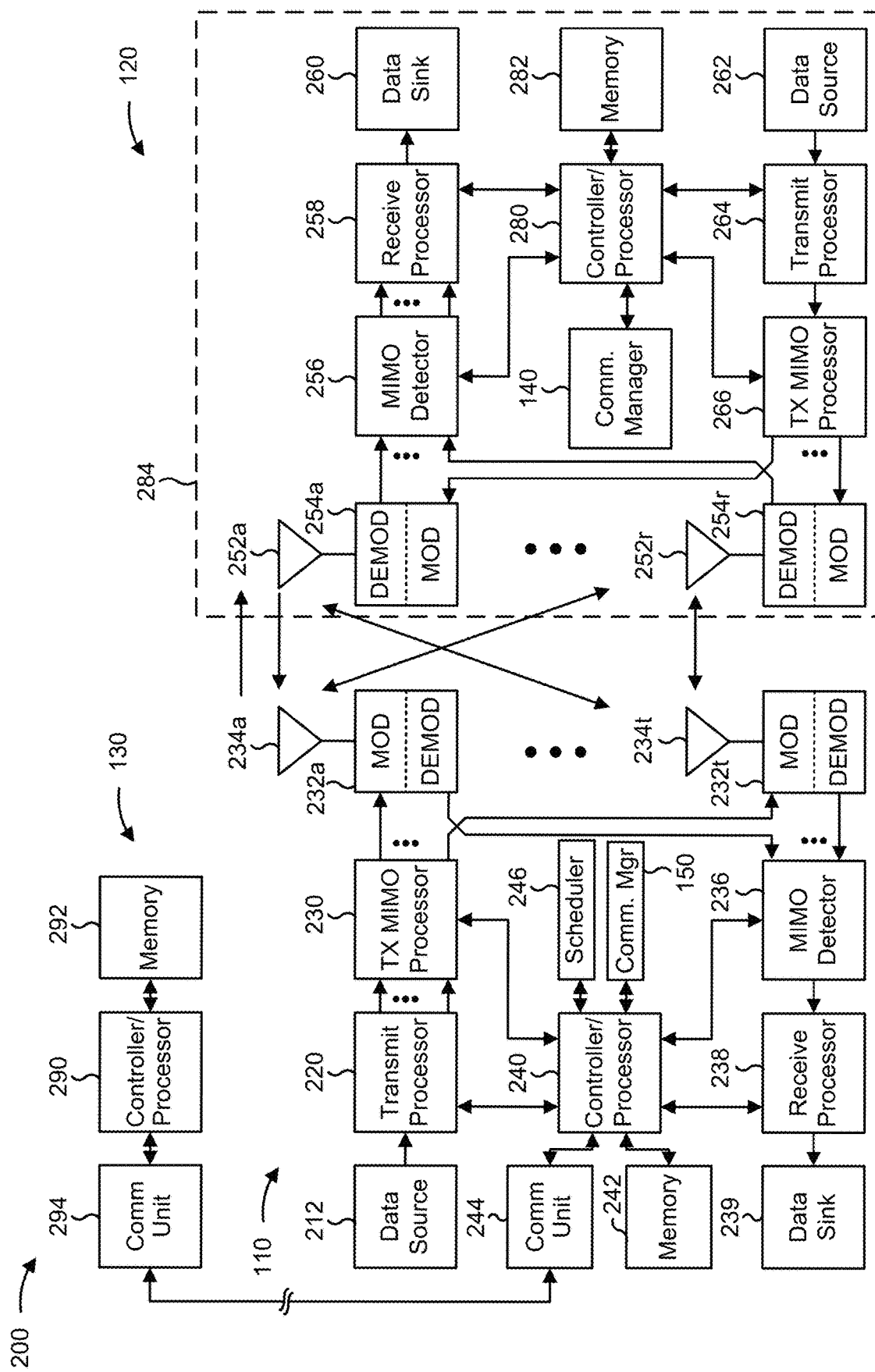
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein.

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods and/or processes described herein.

The controller/processor 240 of the base station 110, the controller/processor 280 of the UE 120, and/or any other component(s) of FIG. 2 may perform one or more techniques associated with reporting data indicating conditions similar to a past event, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the UE includes means for receiving, from a base station, configuration information specifying similarity data to be provided in an L1 report; and/or means for transmitting, to the base station and based at least in part on receiving the configuration information, the L1 report. The L1 report indicates a measure of similarity between a current condition of the UE and a past condition of the UE associated with a past event associated with the UE. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting, to a UE, configuration information specifying similarity data to be provided in an L1 report; and/or means for receiving, from the UE and based at least in part on transmitting the configuration information, the L1 report. The L1 report indicates a measure of similarity between a current condition of the UE and a past condition of the UE associated with a past event associated with the UE. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
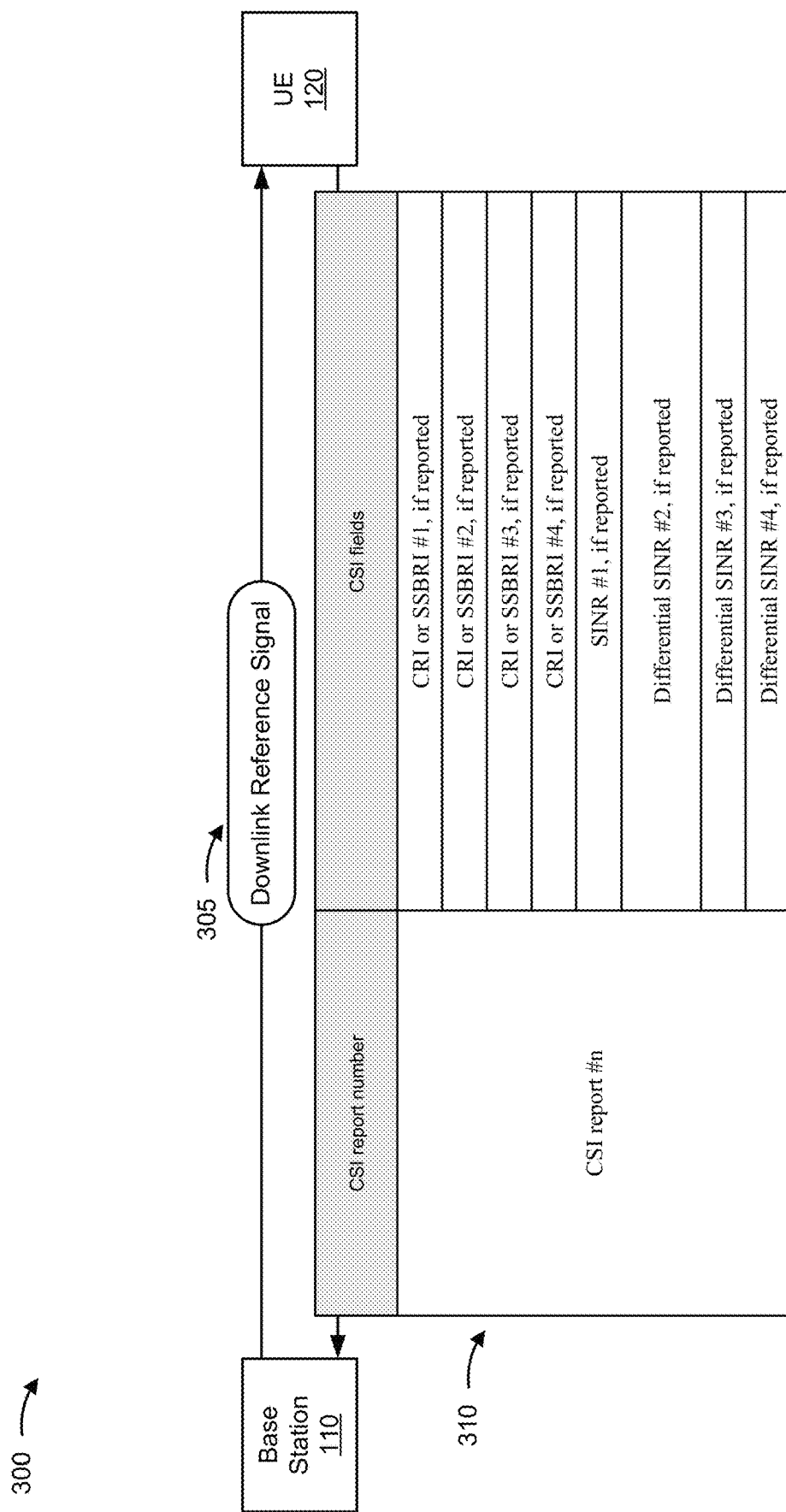
FIG. 3 is a diagram illustrating an example of an L1 report, in accordance with the present disclosure.

FIG. 3 is a diagram illustrating an example 300 of an L1 report, in accordance with the present disclosure. An L1 report may be transmitted by a UE (e.g., UE 120) to a base station (e.g., base station 110) in response to a downlink reference signal transmitted by the base station to the UE. An L1 report is a physical layer report that may be used to provide the base station with information that facilitates communications between the base station and the UE.

As shown by reference number 305, the base station may transmit a downlink reference signal to the UE. For example, a downlink reference signal, transmitted from the base station to the UE, may include a synchronization signal block (SSB), a channel state information (C SI) reference signal (CSI-RS), a demodulation reference signal (DMRS), a positioning reference signal (PRS), or a phase tracking reference signal (PTRS), among other examples.

An SSB may carry information used for initial network acquisition and synchronization, such as a primary synchronization signal (PSS), a secondary synchronization signal (SSS), a physical broadcast channel (PBCH), and a PBCH DMRS. An SSB is sometimes referred to as a synchronization signal/PBCH (SS/PBCH) block. In some examples, the base station may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station may configure a set of CSI-RSs for the UE, and the UE may measure the configured set of CSI-RSs. Based at least in part on the measurements, the UE may perform channel estimation and may report channel estimation parameters to the base station in the L1 report (e.g., also referred to as a CSI report). The channel estimation parameters may include a channel quality indicator (CQI), a precoding matrix indicator (PMI), a CSI-RS resource indicator (CRI), a layer indicator (LI), a rank indicator (RI), a signal-to-interference plus noise ratio (SINR), or a reference signal received power (RSRP), among other examples. The base station may use the L1 report to select transmission parameters for downlink communications to the UE, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

A DMRS may carry information used to estimate a radio channel for demodulation of an associated physical channel (e.g., physical downlink control channel (PDCCH), physical downlink shared channel (PDSCH), physical broadcast channel (PBCH), physical uplink control channel (PUCCH), or physical uplink shared channel (PUSCH)). A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. A PRS may carry information used to enable timing or ranging measurements of the UE based on signals transmitted by the base station to improve observed time difference of arrival (OTDOA) positioning performance.

The L1 report may be used for a variety of purposes, including beam management procedures to facilitate beam selection between the UE and the base station. For example, a first beam management procedure may include the base station performing beam sweeping over multiple transmit (Tx) beams. The base station may transmit a CSI-RS using each transmit beam for beam management. To enable the UE to perform receive (Rx) beam sweeping, the base station may use a transmit beam to transmit (e.g., with repetitions) each CSI-RS at multiple times within the same RS resource set so that the UE can sweep through receive beams in multiple transmission instances. For example, for each transmit beam of the base station, the UE may perform beam sweeping through the receive beams of the UE. As a result, the first beam management procedure may enable the UE to measure a CSI-RS on different transmit beams using different receive beams to support selection of base station transmit beams/UE receive beam(s) beam pair(s). The UE may report the measurements to the base station, using the L1 report, to enable the base station to select one or more beam pair(s) for communication between the base station and the UE. While the foregoing example has been described in connection with CSI-RSs, the first beam management process may also use SSBs for beam management in a similar manner as described above.

As another example, a second beam management procedure may include the base station performing beam sweeping over one or more transmit beams. The one or more transmit beams may be a subset of all transmit beams associated with the base station (e.g., determined based at least in part on measurements reported by the UE in connection with the first beam management procedure). The base station may transmit a CSI-RS using each transmit beam of the one or more transmit beams for beam management. The UE may measure each CSI-RS using a single (e.g., a same) receive beam (e.g., determined based at least in part on measurements performed in connection with the first beam management procedure). The second beam management procedure may enable the base station to select a best transmit beam based at least in part on measurements of the CSI-RSs (e.g., measured by the UE using the single receive beam) reported by the UE in the L1 report.

A third example beam management process may include the base station transmitting the one or more CSI-RSs using a single transmit beam (e.g., determined based at least in part on measurements reported by the UE in connection with the first beam management procedure and/or the second beam management procedure). To enable the UE to perform receive beam sweeping, the base station may use a transmit beam to transmit (e.g., with repetitions) CSI-RS at multiple times within the same RS resource set so that UE can sweep through one or more receive beams in multiple transmission instances. The one or more receive beams may be a subset of all receive beams associated with the UE (e.g., determined based at least in part on measurements performed in connection with the first beam management procedure and/or the second beam management procedure). The third beam management procedure may enable the base station and/or the UE to select a best receive beam based at least in part on reported measurements received from the UE (e.g., of the CSI-RS of the transmit beam using the one or more receive beams).

As shown by reference number 310, an example L1 report may include measurements for up to four beams per configured report. For example, the first four CSI fields in the example L1 report may indicate a CSI reference signal resource indicator (CRI) or SS/PBCH block resource indicator (SSBRI) to identify beams associated with the report. The fifth field of the example CSI report may indicate an absolute SINR value. The last three fields of the example L1 report may include differential SINR values calculated with respect to the absolute SINR value. The SINR values, both absolute and differential, may facilitate beam selection in a manner that takes into account interference. While the example L1 report includes SINR values, other types of L1 reports may include other values indicative of beam quality, such as RSRP values and/or CQI values, among other examples.

In addition to beam management procedures described herein, the measurements associated with the L1 report (e.g., SINR measurements, RSRP measurements, and/or the like) may also be used to facilitate beam failure detection and/or beam failure recovery processes. For example, in operation, the UE may need to perform a beam failure detection (BFD) measurement associated with the base station (e.g., such that the UE can detect a beam failure associated with the base station). For example, the UE may measure a characteristic (e.g., an SINR, RSRP, and/or the like) of a BFD reference signal (BFD-RS) (e.g., an SSB, a CSI-RS, and/or the like) on a beam associated with the base station. If the characteristic fails to satisfy a threshold (e.g., if the SINR and/or RSRP is lower than a particular value), then the UE may identify a beam failure instance. The UE detects a beam failure when the number of beam failure instances reaches a configured threshold within a particular period of time (e.g., before a configured timer expires). After the beam failure is detected, the UE may perform a beam failure recovery procedure, which includes initiating a random access channel (RACH) procedure and selecting a suitable beam to perform beam failure recovery. Upon completion of the RACH procedure, beam failure recovery is considered complete.

While reference signals enable the UE to perform beam failure detection and recovery procedures, beam failure detection and recovery procedures may use significant UE power and communication resources in recovering from beam failure, such as resources for performing a RACH procedure, beam sweeping, additional reporting, and/or the like. In addition, beam failure recovery takes time to perform, during which the UE may experience degraded communications capabilities, such as increased latency, decreased throughput, and/or the like. While the L1 report may provide the base station with an indication of signal quality (e.g., SINR, RSRP, and/or the like), the L1 report is designed to carry a limited amount information in an effort to conserve resources given the relatively high frequency at which the L1 reports are transmitted. While other types of reporting, such as Layer 3 (L3) reporting, minimization of drive test (MDT) reporting, and/or the like, are capable of carrying more information than some L1 reports, the additional reported information may take longer to process and/or transmit than the information in L1 reports, which may render some L3 reporting methods unsuitable for some time sensitive and/or resource limited applications.

As indicated above, FIG. 3 is provided as an example. Other examples may differ from what is described with respect to FIG. 3.

Some techniques and apparatuses described herein enable a UE to transmit, and a base station to receive, an L1 report indicating a measure of similarity between a current condition of the UE and a past condition of the UE associated with a past event associated with the UE. The L1 report may be transmitted based on configuration information provided by the base station to the UE. In some aspects, the base station and/or the UE may use the L1 report to determine when the UE may be operating in conditions similar to conditions of a past beam failure recovery event and, in this way, be used to predict whether a beam failure event may occur. By including the similarity to past event conditions in the L1 report, both the UE and the base station may be provided with situational awareness regarding the UE, and the ability to predict when a beam failure event may occur may also enable the UE and/or the base station to take one or more actions designed to address the predicted beam failure. This may reduce the resources (e.g., time, processing, and/or communication resources, among other examples) used in determining how to handle a beam failure event and reduce the resources (e.g., time, processing, and/or communication resources, among other examples) used to handle the beam failure event.

Figure 4:
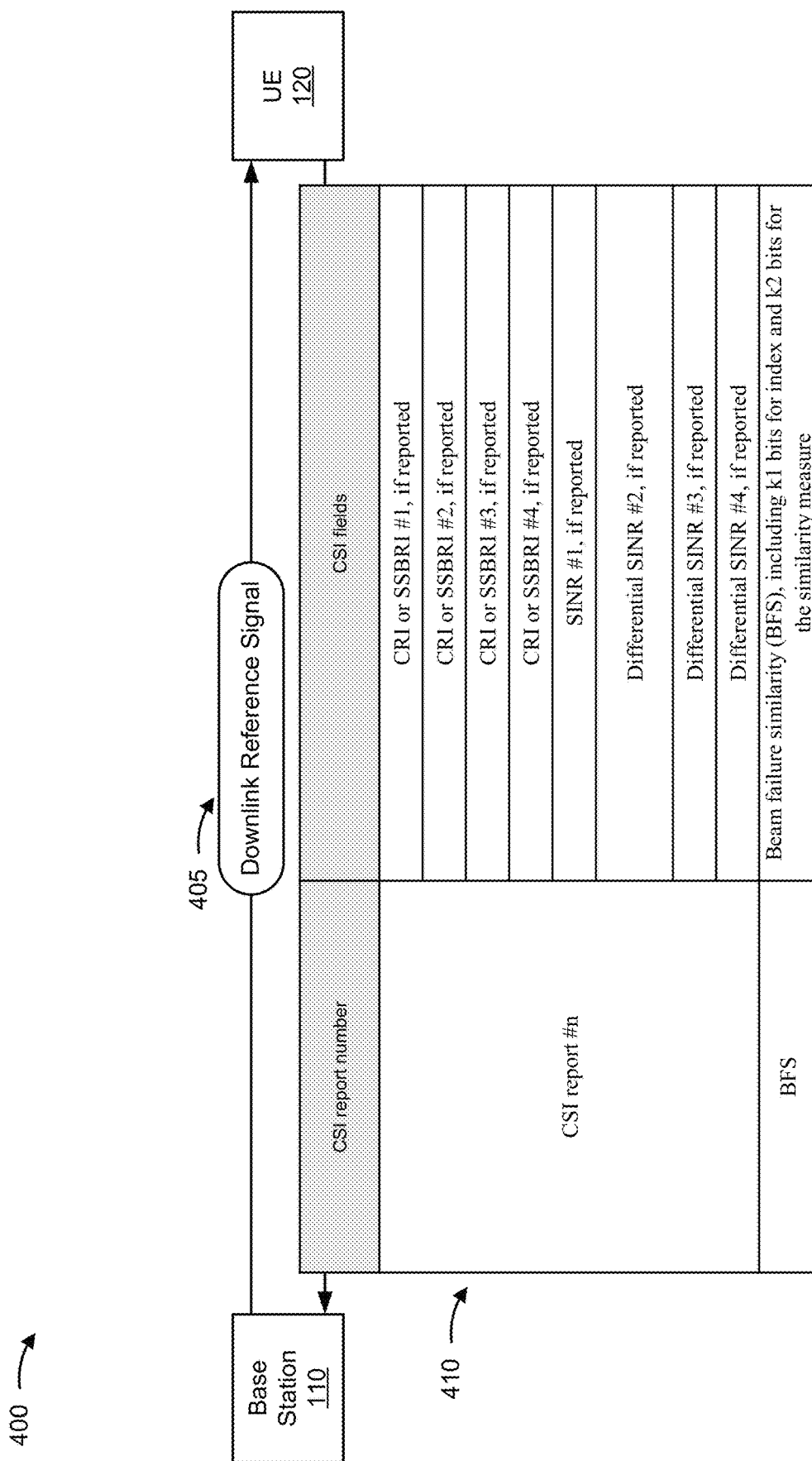
FIG. 4 is a diagram illustrating an example of an L1 report indicating conditions similar to a past event, in accordance with the present disclosure.

FIG. 4 is a diagram illustrating an example 400 of an L1 report indicating conditions similar to a past event, in accordance with the present disclosure. As shown in FIG. 4, a UE (e.g., UE 120) may transmit, and a base station (e.g., base station 110) may receive, an L1 report in response to a downlink reference signal (e.g., CSI-RS) transmitted by the base station to the UE.

As shown by reference number 405, the base station may transmit a downlink reference signal to the UE. The downlink reference signal may be similar to the downlink reference signal described herein (e.g., with reference to FIG. 3).

As shown by reference number 410, the example L1 report is an L1-SINR report having the first eight CSI fields indicating information similar to the information included in the example L1 report described herein (e.g., with reference to FIG. 3).

The example L1 report also includes an additional CSI field to indicate a measurement of similarity between a current condition of the UE and one or more past conditions of the UE (e.g., past conditions associated with past beam failure events). The indication may be referred to as beam failure similarity (BFS) data, or similarity data, and the example L1 report, or the portion indicating BFS, may be referred to as a BFS report. In some aspects, the CSI field may include similarity data that includes k1 bits for an index and k2 bits for the similarity measure. For example, k1 may be 2 bits to identify one of four past beam failure events, and k2 may be 4 bits to indicate a measure of similarity between a current condition of the UE and a past condition of the UE associated with the beam failure event identified by k1. The manner (i.e., method) by which the measure of similarity is determined is described further herein.

As indicated above, FIG. 4 is provided as an example. Other examples may differ from what is described with respect to FIG. 4. For example, while the example L1 report is an L1-SINR report, the L1 report may be another type of L1 report, such as an L1-RSRP report. Similarly, a different number and/or different arrangement of bits may be used to indicate BFS.

Figure 5:
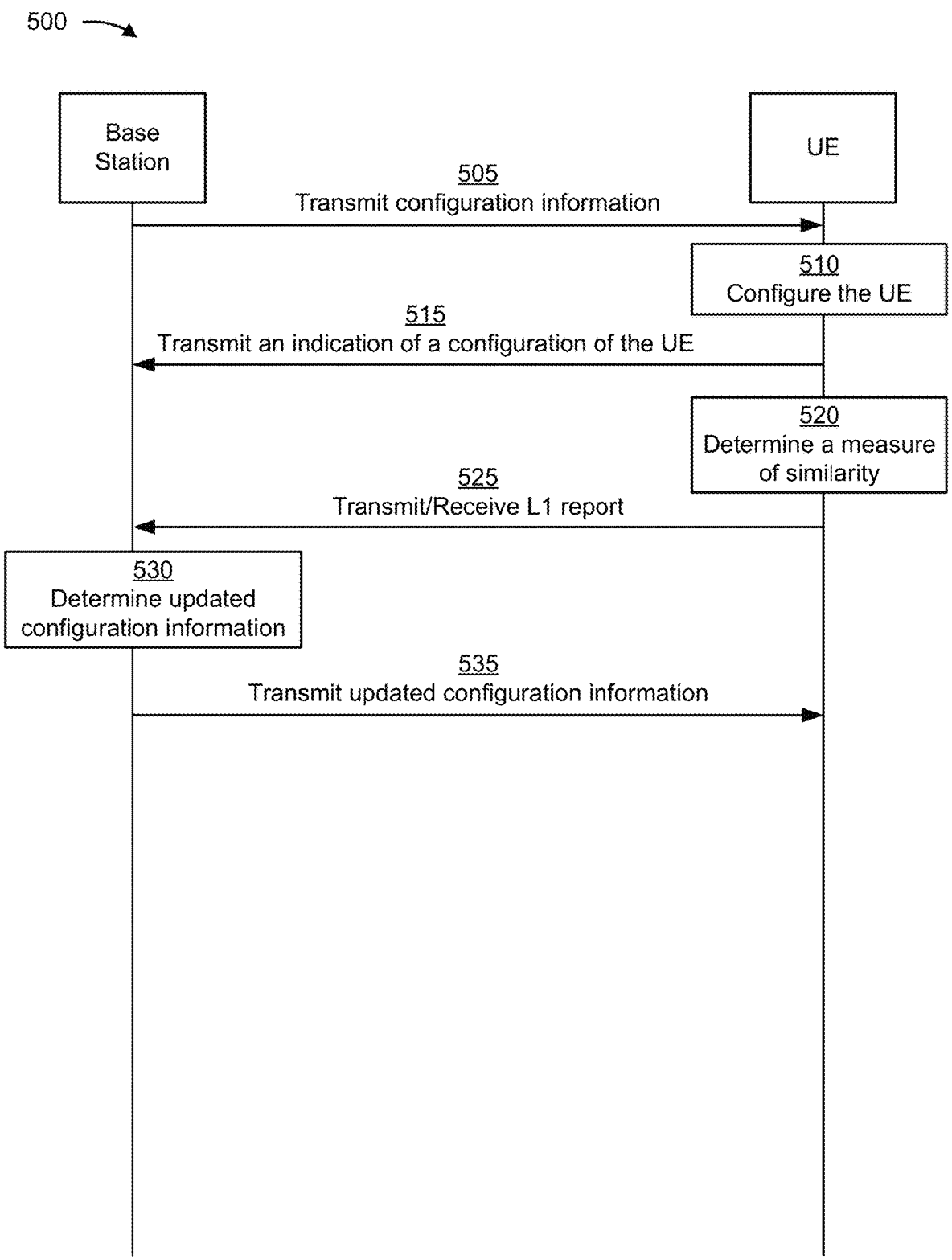
FIG. 5 is a diagram illustrating an example associated with reporting data indicating conditions similar to a past event, in accordance with the present disclosure.

FIG. 5 is a diagram illustrating an example 500 associated with reporting data indicating conditions similar to a past event, in accordance with the present disclosure. As shown in FIG. 5, a UE (e.g., UE 120) may communicate (e.g., transmit an uplink transmission and/or receive a downlink transmission) with a base station (e.g., base station 110). The UE and the base station may be part of a wireless network (e.g., wireless network 100).

As shown by reference number 505, the base station may transmit, and the UE may receive, configuration information. In some aspects, the UE may receive configuration information from another device (e.g., from another base station or another UE). In some aspects, the UE may receive the configuration information via radio resource control (RRC) signaling and/or medium access control (MAC) signaling (e.g., MAC control elements (MAC CEs)). In some aspects, the configuration information may include an indication of one or more configuration parameters (e.g., already known to the UE) for selection by the UE and/or explicit configuration information for the UE to use to configure the UE.

In some aspects, the configuration information may indicate that the UE is to transmit, to the base station, an L1 report indicating a measure of similarity between a current condition of the UE and a past condition of the UE associated with a past event associated with the UE. For example, the UE may be configured to provide an L1-SINR report, or an L1-RSRP report, which includes similarity data, which includes information indicating a measure of similarity between a current condition of the UE (e.g., a location, a time, signal measurement, and/or the like) and a past condition of the UE (e.g., a past location, a past time, past signal measurement) associated with a past beam failure event (e.g., a past beam failure instance and/or a past beam failure recovery event). In some aspects, the configuration information may specify a manner of determining the measure of similarity, as described further herein. In some aspects, the configuration information may indicate that the UE is to include, in the L1 report (e.g., in the similarity data), a first number of bits for an event index (e.g., 2 bits) and a second number of bits (e.g., 4 bits) for the measure of similarity. In some aspects, the configuration information may indicate that the base station may be configured to receive the L1 report. For example, the base station may be configured to receive the L1 report and use the L1 report for subsequent configuration of the UE.

As shown by reference number 510, the UE may configure the UE for communicating with the base station. In some aspects, the UE may configure the UE based at least in part on the configuration information. In some aspects, the UE may be configured to perform one or more operations described herein.

As shown by reference number 515, the UE may transmit, and the base station may receive, an indication of a configuration of the UE to communicate (e.g., one or more of uplink transmissions) a BFS report to the base station. For example, the UE may indicate a configuration of the UE to determine a measure of similarity between a current condition of the UE and past conditions of the UE associated with past beam failure events, and transmit information indicating the measure of similarity to the base station as part of an L1 report. In some aspects, the UE may transmit the indication of UE capability via RRC signaling, one or more MAC CEs, and/or a physical uplink control channel (PUCCH) message, among other examples.

As shown by reference number 520, the UE may determine the measure of similarity based at least in part on a prior UE location associated with the past event and/or a prior UE signal measurement associated with the past event. For example, the current condition of the UE may include information identifying the UE's current location (e.g., based on signal measurements, network information, static known location, and/or the like) as well as signal measurements associated with the base station and/or other network components (e.g., other base stations, TRPs, and/or the like). The measure of similarity may be determined based on how close the UE's current location is to a prior UE location and how close one or more current signal measurements of the UE are to prior UE signal measurements. In some aspects, time (e.g., time of day) may also be a factor in determining the measure of similarity between the current condition of the UE and a past condition of the UE.

In some aspects, the location and signal measurements of the UE may be used to indicate that the UE is currently in the same or similar circumstances as the UE was in when a past event (e.g., beam failure event) occurred. The measure of similarity may be calculated in a variety of ways. In some aspects, the measure of similarity may be a linear calculation based on a preconfigured minimum or maximum similarity associated with UE location, signal measurements, and/or time. In some aspects, the measure of similarity may be determined using a machine learning model, a neural network model, or other modeling techniques. For example, based on historical instances of beam failure, beam failure recovery events, and/or the like, a machine learning model and/or a neural network model may be trained to determine the measure of similarity given one or more variables as input, such as the UE location, UE signal measurements, and/or time of day. In some aspects, a statistical estimation technique may be used to infer, from the information available to the UE (e.g., UE location, UE signal measurements, time of day, and/or the like) the measure of similarity.

In some aspects, determining the measure of similarity depends on a type of the L1 report. For example, the manner in which the UE determines the measure of similarity may be different for an L1-SINR report than for an L1-RSRP report. Differences may include, for example, different formulas for measuring similarity, different variables (e.g., UE location, UE signal measurements, time of day) being considered, and/or different sets of training data for different machine learning modeling, neural network modeling, statistical modeling, and/or other modeling techniques.

As noted herein, the manner of determining the measure of similarity may be specified by the configuration information. In some aspects, the manner of determining the measure of similarity may be predefined (e.g., in a standard or by UE configuration). In some aspects, portions of the manner of determining the measure of similarity may be specified by different sources (e.g., a portion specified by configuration data, another portion specified by a standard, and/or another portion preconfigured on the UE). For example, the structure of a machine learning model and/or neural network model may be at least partially defined by a standard specification and/or configured by the base station.

As shown by reference number 525, the UE may transmit, and the base station may receive, the L1 report. In some aspects, the L1 report may indicate a measure of similarity between a current condition of the UE and a past condition of the UE associated with a past event associated with the UE. For example, the L1 report may include similarity data indicating how similar the current condition of the UE is to a past beam failure event of the UE.

In some aspects, the L1 report includes an L1-SINR report. In some aspects, the L1 report includes an L1-RSRP report. For example, the L1 report may include the measure of similarity in an L1-SINR or L1-RSRP report (e.g., as described herein). In some aspects, the L1 report may include an event index identifying the past event from multiple past events. For example, while information regarding multiple past beam failure events may be stored by the UE and/or base station, the similarity data included in the L1 report may include k1 bits of a CSI field of the L1 report (e.g. a portion of the similarity data), which may be used to identify a particular past beam failure event from multiple stored past beam failure events. In some aspects, the event index may begin from a most recent event of the multiple past events. For example, each of the four most recent beam failure events may be identified by a different event index value, with the most recent beam failure event beginning with an index of 0. In some aspects, a field of the L1 report (e.g., a portion of the similarity data) may include 6 bits, wherein the measure of similarity may be indicated by 4 bits included in the L1 report, and the index identifying the past event may be indicated by 2 bits included in the L1 report. For example, a CSI field of the L1 report may include similarity data that includes 2 bits as an index, capable of identifying up to four past beam failure events, and 4 bits for the measure of similarity, capable of identifying up to 16 different measures of similarity.

In some aspects, the index may be used to indicate the most similar beam failure events among the past k beam failure events. For example, rather than storing index information for the most recent k beam failure events, the UE and/or the base station may store index information enabling identification of the past k beam failure events having corresponding past UE conditions that are most similar to the current UE condition. In some aspects, the measure of similarity may be greater than other measures of similarity associated with other past conditions associated with other past events. For example, a past UE condition identified in the L1 report may be the most similar from multiple past UE conditions for which data is stored by the UE. This may enable the UE to identify, to the base station, the past UE condition and corresponding beam failure event that might be most relevant to the current UE condition.

As shown by reference number 530, the base station may determine updated configuration information. In some aspects, the updated configuration information may be based at least in part on the L1 report. For example, the base station may use the information indicated in the L1 report to determine an updated method of determining measures of similarity between current and past conditions of the UE.

In a situation where a machine learning model is used to determine the measures of similarity, information indicated in the L1 report may be used, alone or in combination with other information, to re-train the machine learning model and generate an updated machine learning model. In this situation, for example, weights assigned to various inputs of the machine learning model (e.g., distance between past UE location and current UE location, signal measurement differences between past UE signal measurement(s) and current UE signal measurement(s), and/or a time associated with past event and a current time, among other examples) may be adjusted. The adjustments may be based at least in part on whether one or more actions taken by the UE to address a beam failure event were identified (e.g., by the UE and/or the base station) as successful. In some aspects, a successful action or set of actions may include, for example, the UE maintaining a current communication beam with the base station without triggering a beam failure recovery procedure within a threshold period of time of determining to maintain the current communication beam; the UE performing contention free RACH with the base station without triggering a beam failure recovery procedure within a threshold period of time of performing the contention free RACH; and/or the UE performing contention free RACH with another TRP without triggering a beam failure recovery procedure within a threshold period of time after performing the contention free RACH.

In a situation where a neural network model is used to determine the measures of similarity, information indicated in the L1 report may be used, alone or in combination with other information, to re-train the neural network model and generate an updated neural network model in a manner similar to that described herein for the machine learning model. Similarly, other methods for determining measures of similarity described herein may be updated. In some aspects, information used to update the method of determining similarity may be obtained from other sources, such as other reports, including L1 report, from other UEs and/or base stations.

As shown by reference number 540, the base station may transmit, and the UE may receive, updated configuration information indicating an updated method of determining measures of similarity. For example, the base station may transmit updated configuration information in a manner similar to that described herein (e.g., as described with respect to reference number 505). The updated configuration information may enable the UE to update the method of determining measures of similarity, which may enable the UE to provide L1 reports that include measures of similarity determined using the updated method.

As indicated above, FIG. 5 is provided as an example. Other examples may differ from what is described with regard to FIG. 5.

In this way, some techniques and apparatuses described herein may be used to predict whether a beam failure event may occur based on L1 reports generated by the UE. By including the similarity to past event conditions in the L1 report, both the UE and the base station may be provided with situational awareness regarding the UE, and the ability to predict when a beam failure event may occur may also enable the UE and/or the base station to take one or more actions designed to address the predicted beam failure. This may reduce resources (e.g., time, processing, and/or communication resources, among other examples) used in determining how to handle a beam failure event and reduce resources (e.g., time, processing, and/or communication resources, among other examples) used to handle the beam failure event.

Figure 6:
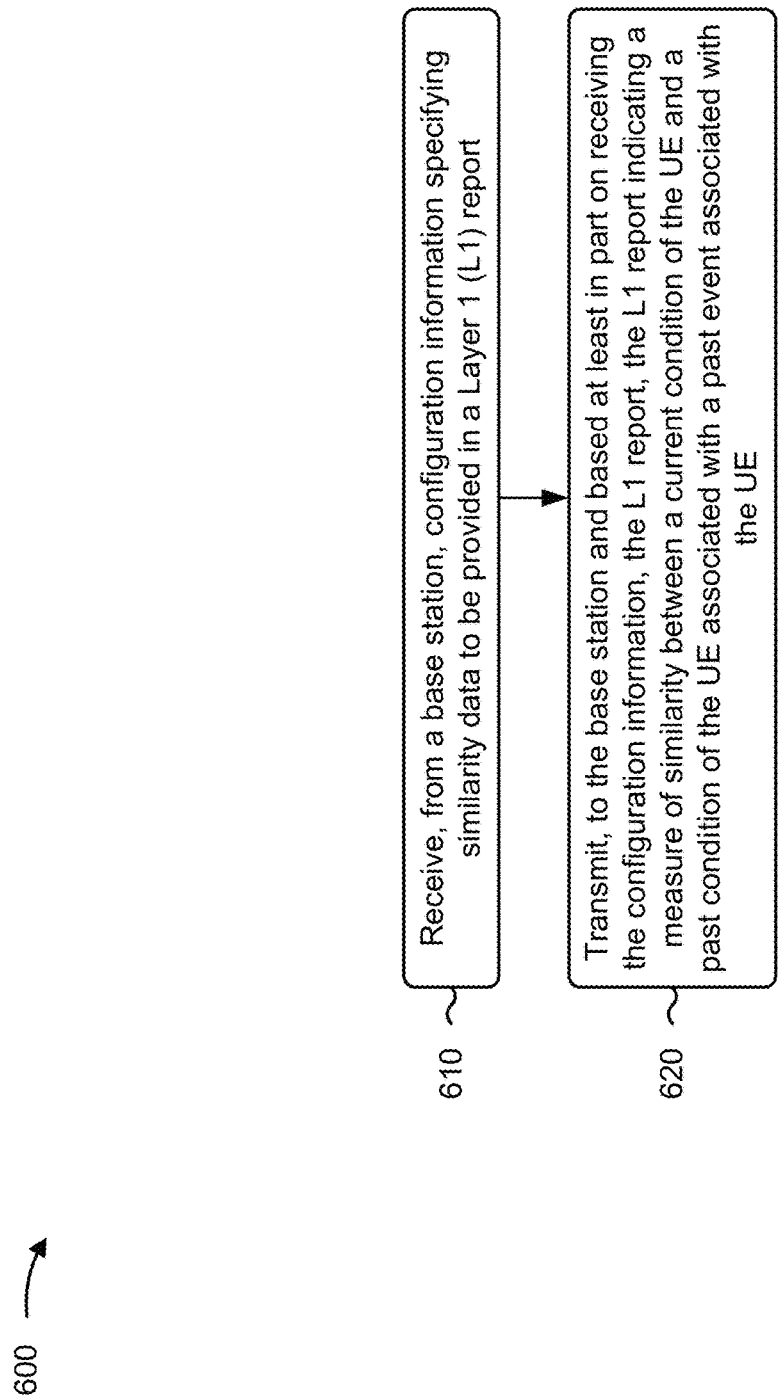
FIGS. 6 and 7 are diagrams illustrating example processes associated with reporting data indicating conditions similar to a past event, in accordance with the present disclosure.

FIG. 6 is a diagram illustrating an example process 600 performed, for example, by a UE, in accordance with the present disclosure. Example process 600 is an example where the UE (e.g., UE 120) performs operations associated with reporting data indicating conditions similar to a past event.

As shown in FIG. 6, in some aspects, process 600 may include receiving, from a base station, configuration information specifying similarity data to be provided in an L1 report (block 610). For example, the UE (e.g., using communication manager 140 and/or reception component 802, depicted in FIG. 8) may receive, from a base station, configuration information specifying similarity data to be provided in an L1 report, as described above.

As further shown in FIG. 6, in some aspects, process 600 may include transmitting, to the base station and based at least in part on receiving the configuration information, the L1 report, wherein the L1 report indicates a measure of similarity between a current condition of the UE and a past condition of the UE associated with a past event associated with the UE (block 620). For example, the UE (e.g., using communication manager 140 and/or transmission component 804, depicted in FIG. 8) may transmit, to the base station and based at least in part on receiving the configuration information, the L1 report. The L1 report indicates a measure of similarity between a current condition of the UE and a past condition of the UE associated with a past event associated with the UE, as described above.

Process 600 may include additional aspects, such as any single aspect or any combination of aspects described below and/or in connection with one or more other processes described elsewhere herein.

In a first aspect, the past event is a beam failure recovery (BFR) event.

In a second aspect, alone or in combination with the first aspect, the L1 report comprises an L1-signal-to-interference-plus-noise ratio (L1-SINR) report.

In a third aspect, alone or in combination with the first aspect, the L1 report comprises an L1-reference signal received power (L1-RSRP) report.

In a fourth aspect, alone or in combination with one or more of the first through third aspects, process 600 includes determining the measure of similarity based at least in part on one or more of a prior UE location associated with the past event, or a prior UE signal measurement associated with the past event.

In a fifth aspect, alone or in combination with one or more of the first through fourth aspects, a manner of determining the measure of similarity depends on a type of the L1 report.

In a sixth aspect, alone or in combination with one or more of the first through fifth aspects, a manner of determining the measure of similarity is specified by the configuration information.

In a seventh aspect, alone or in combination with one or more of the first through sixth aspects, the L1 report includes an event index identifying the past event from a plurality of past events.

In an eighth aspect, alone or in combination with one or more of the first through seventh aspects, the event index begins from a most recent event of the plurality of past events.

In a ninth aspect, alone or in combination with one or more of the first through eighth aspects, the measure of similarity is based at least in part on at least one of a machine learning model or a neural network model.

In a tenth aspect, alone or in combination with one or more of the first through ninth aspects, the measure of similarity is indicated by 4 bits included in the L1 report, and an index identifying the past event is indicated by 2 bits included in the L1 report.

In an eleventh aspect, alone or in combination with one or more of the first through tenth aspects, the measure of similarity is greater than other measures of similarity associated with other past conditions associated with other past events.

In a twelfth aspect, alone or in combination with one or more of the first through eleventh aspects, a first number of bits for an event index, and a second number of bits for the measure of similarity, are included in the configuration information.

In a thirteenth aspect, alone or in combination with one or more of the first through twelfth aspects, process 600 includes receiving updated configuration information indicating an updated method of determining measures of similarity, and determining an updated measure of similarity based at least in part on the updated method.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
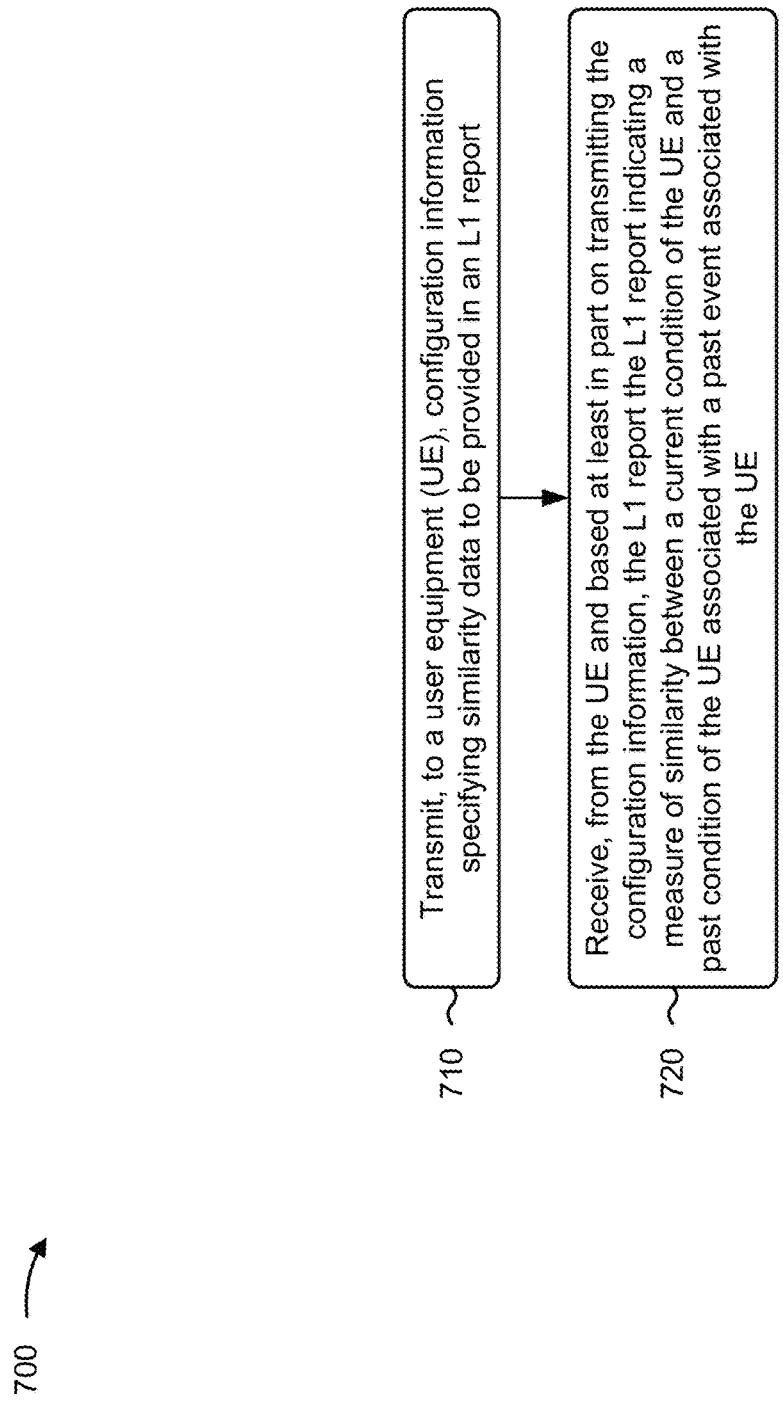

FIG. 7 is a diagram illustrating an example process 700 performed, for example, by a base station, in accordance with the present disclosure. Example process 700 is an example where the base station (e.g., base station 110) performs operations associated with reporting data indicating conditions similar to a past event.

As shown in FIG. 7, in some aspects, process 700 may include transmitting, to a UE, configuration information specifying similarity data to be provided in an L1 report (block 710). For example, the base station (e.g., using communication manager 150 and/or transmission component 904, depicted in FIG. 9) may transmit, to a UE, configuration information specifying similarity data to be provided in an L1 report, as described above.

As further shown in FIG. 7, in some aspects, process 700 may include receiving, from the UE and based at least in part on transmitting the configuration information, the L1 report, wherein the L1 report indicates a measure of similarity between a current condition of the UE and a past condition of the UE associated with a past event associated with the UE (block 720). For example, the base station (e.g., using communication manager 150 and/or reception component 902, depicted in FIG. 9) may receive, from the UE and based at least in part on transmitting the configuration information, the L1 report. The L1 report indicates a measure of similarity between a current condition of the UE and a past condition of the UE associated with a past event associated with the UE, as described above.

Process 700 may include additional aspects, such as any single aspect or any combination of aspects described below and/or in connection with one or more other processes described elsewhere herein.

In a first aspect, the past event is a beam failure recovery (BFR) event.

In a second aspect, alone or in combination with the first aspect, the L1 report comprises an L1-signal-to-interference plus noise ratio (L1-SINR) report.

In a third aspect, alone or in combination with the first aspect, the L1 report comprises an L1-reference signal received power (L1-RSRP) report.

In a fourth aspect, alone or in combination with one or more of the first through third aspects, the configuration information specifies a method of determining the measure of similarity.

In a fifth aspect, alone or in combination with one or more of the first through fourth aspects, the method of determining the measure of similarity indicates that the measure of similarity is to be based at least in part on one or more of a prior UE location associated with the past event, or a prior UE signal measurement associated with the past event.

In a sixth aspect, alone or in combination with one or more of the first through fifth aspects, a manner of determining the measure of similarity depends on a type of the L1 report.

In a seventh aspect, alone or in combination with one or more of the first through sixth aspects, a manner of determining the measure of similarity includes using at least one of a machine learning model or a neural network model.

In an eighth aspect, alone or in combination with one or more of the first through seventh aspects, the L1 report includes an event index identifying the past event from a plurality of past events.

In a ninth aspect, alone or in combination with one or more of the first through eighth aspects, the event index begins from a most recent event of the plurality of past events.

In a tenth aspect, alone or in combination with one or more of the first through ninth aspects, the measure of similarity is indicated by 4 bits included in the L1 report, and an index identifying the past event is indicated by 2 bits included in the L1 report.

In an eleventh aspect, alone or in combination with one or more of the first through tenth aspects, a first number of bits for an event index, and a second number of bits for the measure of similarity, are specified by the configuration information.

In a twelfth aspect, alone or in combination with one or more of the first through eleventh aspects, process 700 includes transmitting updated configuration information indicating an updated method of determining measures of similarity, and receiving an updated measure of similarity based at least in part on transmitting the updated configuration information.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
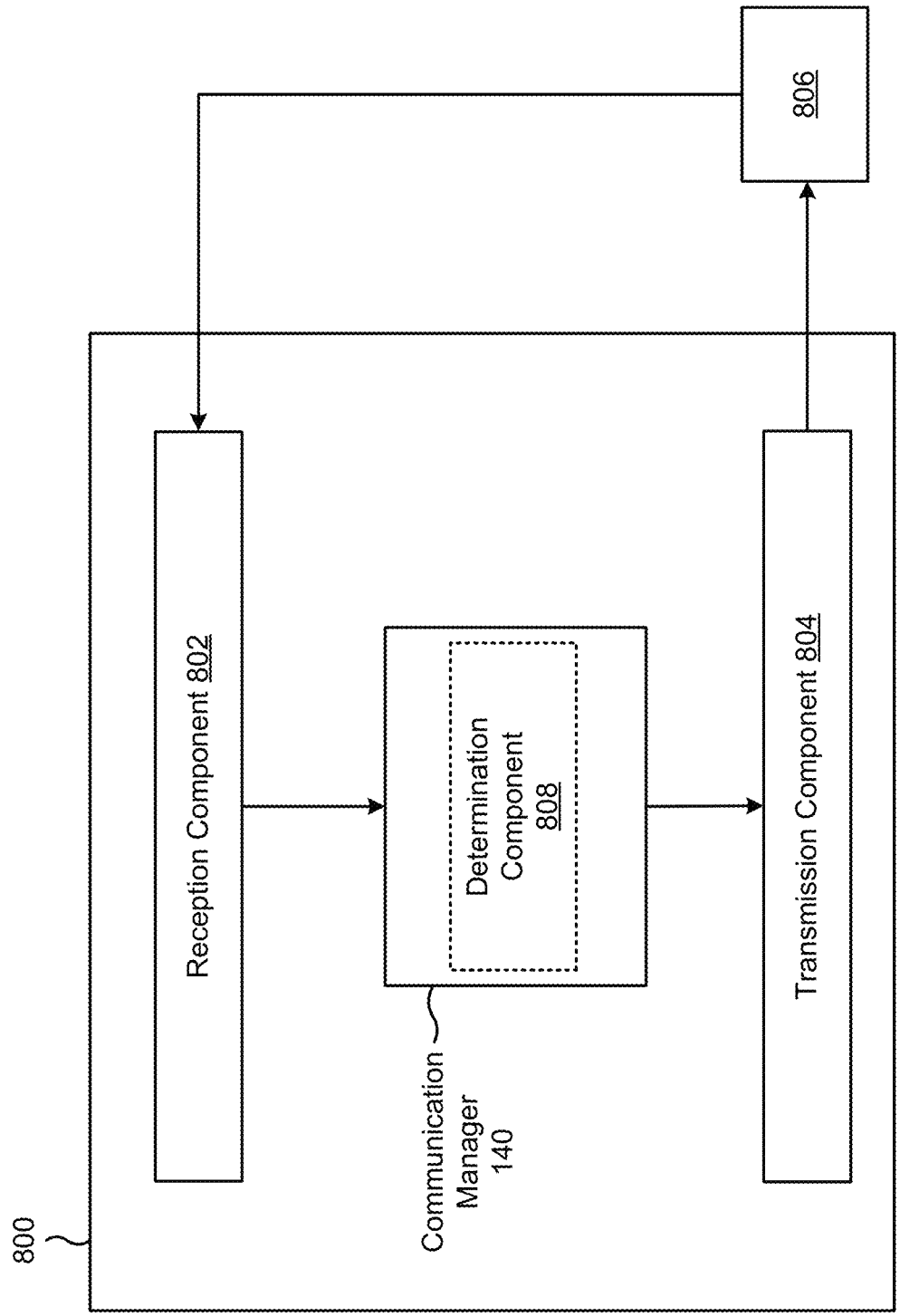

FIG. 8 is a diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include a determination component 808, among other examples.

In some aspects, the apparatus 800 may be configured to perform one or more operations described herein in connection with FIGS. 4 and 5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The reception component 802 may receive, from a base station, configuration information specifying similarity data to be provided in an L1 report. The transmission component 804 may transmit, to the base station and based at least in part on receiving the configuration information, the L1 report. The L1 report indicates a measure of similarity between a current condition of the UE and a past condition of the UE associated with a past event associated with the UE.

The determination component 808 may determine the measure of similarity based at least in part on one or more of a prior UE location associated with the past event or a prior UE signal measurement associated with the past event.

The reception component 802 may receive updated configuration information indicating an updated method of determining measures of similarity.

The determination component 808 may determine an updated measure of similarity based at least in part on the updated method.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

FIG. 9 is a diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150.

In some aspects, the apparatus 900 may be configured to perform one or more operations described herein in connection with FIGS. 4 and 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a modem, a demodulator, a MIMO detector, a receive processor, a controller/processor, a memory, or a combination thereof, of the base station described in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the base station described in connection with FIG. 2. In some aspects, the transmission component 904 may be co-located with the reception component 902 in a transceiver.

The transmission component 904 may transmit, to a UE, configuration information specifying similarity data to be provided in an L1 report. The reception component 902 may receive, from the UE and based at least in part on transmitting the configuration information, the L1 report. The L1 report indicates a measure of similarity between a current condition of the UE and a past condition of the UE associated with a past event associated with the UE.

The transmission component 904 may transmit updated configuration information indicating an updated method of determining measures of similarity.

The reception component 902 may receive an updated measure of similarity based at least in part on transmitting the updated configuration information.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving, from a base station, configuration information specifying similarity data to be provided in an L1 report; and transmitting, to the base station and based at least in part on receiving the configuration information, the L1 report, wherein the L1 report indicates a measure of similarity between a current condition of the UE and a past condition of the UE associated with a past event associated with the UE.

Aspect 2: The method of Aspect 1, wherein the past event is a beam failure recovery (BFR) event.

Aspect 3: The method of Aspect 1 or Aspect 2, wherein the L1 report comprises an L1-signal-to-interference plus noise ratio (L1-SINR) report.

Aspect 4: The method of Aspect 1 or Aspect 2, wherein the L1 report comprises an L1-reference signal received power (L1-RSRP) report.

Aspect 5: The method of any of Aspects 1-4, further comprising: determining the measure of similarity based at least in part on one or more of: a prior UE location associated with the past event, or a prior UE signal measurement associated with the past event.

Aspect 6: The method of Aspect 5, wherein a manner of determining the measure of similarity depends on a type of the L1 report.

Aspect 7: The method of Aspect 5, wherein a manner of determining the measure of similarity is specified by the configuration information.

Aspect 8: The method of any of Aspects 1-7, wherein the L1 report includes an event index identifying the past event from a plurality of past events.

Aspect 9: The method of Aspect 8, wherein the event index begins from a most recent event of the plurality of past events.

Aspect 10: The method of any of Aspects 1-9, wherein the measure of similarity is based at least in part on at least one of a machine learning model or a neural network model.

Aspect 11: The method of any of Aspects 1-10, wherein the measure of similarity is indicated by 4 bits included in the L1 report, and an index identifying the past event is indicated by 2 bits included in the L1 report.

Aspect 12: The method of any of Aspects 1-11, wherein the measure of similarity is greater than other measures of similarity associated with other past conditions associated with other past events.

Aspect 13: The method of any of Aspects 1-12, wherein a first number of bits for an event index, and a second number of bits for the measure of similarity, are included in the configuration information.

Aspect 14: The method of any of Aspects 1-13, further comprising: receiving updated configuration information indicating an updated method of determining measures of similarity; and determining an updated measure of similarity based at least in part on the updated method.

Aspect 15: A method of wireless communication performed by a base station, comprising: transmitting, to a user equipment (UE), configuration information specifying similarity data to be provided in an L1 report; and receiving, from the UE and based at least in part on transmitting the configuration information, the L1 report, wherein the L1 report indicates a measure of similarity between a current condition of the UE and a past condition of the UE associated with a past event associated with the UE.

Aspect 16: The method of Aspect 15, wherein the past event is a beam failure recovery (BFR) event.

Aspect 17: The method of Aspect 15 or Aspect 16, wherein the L1 report comprises an L1-signal-to-interference plus noise ratio (L1-SINR) report.

Aspect 18: The method of Aspect 15 or Aspect 16, wherein the L1 report comprises an L1-reference signal received power (L1-RSRP) report.

Aspect 19: The method of any of Aspects 15-18, wherein the configuration information specifies a method of determining the measure of similarity.

Aspect 20: The method of Aspect 19, wherein the method of determining the measure of similarity indicates that the measure of similarity is to be based at least in part on one or more of: a prior UE location associated with the past event, or a prior UE signal measurement associated with the past event.

Aspect 21: The method of Aspect 19, wherein a manner of determining the measure of similarity depends on a type of the L1 report.

Aspect 22: The method of Aspect 19, wherein a manner of determining the measure of similarity includes using at least one of a machine learning model or a neural network model.

Aspect 23: The method of any of Aspects 15-22, wherein the L1 report includes an event index identifying the past event from a plurality of past events.

Aspect 24: The method of Aspect 23, wherein the event index begins from a most recent event of the plurality of past events.

Aspect 25: The method of any of Aspects 15-24, wherein the measure of similarity is indicated by 4 bits included in the L1 report, and an index identifying the past event is indicated by 2 bits included in the L1 report.

Aspect 26: The method of any of Aspects 15-25, wherein a first number of bits for an event index, and a second number of bits for the measure of similarity, are specified by the configuration information.

Aspect 27: The method of any of Aspects 15-26, further comprising: transmitting updated configuration information indicating an updated method of determining measures of similarity; and receiving an updated measure of similarity based at least in part on transmitting the updated configuration information.

Aspect 28: An apparatus for wireless communication at a device, comprising a processor; memory coupled with the processor; and instructions stored in the memory and executable by the processor to cause the apparatus to perform the method of one or more of Aspects 1-14.

Aspect 29: An apparatus for wireless communication at a device, comprising a processor; memory coupled with the processor; and instructions stored in the memory and executable by the processor to cause the apparatus to perform the method of one or more of Aspects 15-27.

Aspect 30: A device for wireless communication, comprising a memory and one or more processors coupled to the memory, the one or more processors configured to perform the method of one or more of Aspects 1-14.

Aspect 31: A device for wireless communication, comprising a memory and one or more processors coupled to the memory, the one or more processors configured to perform the method of one or more of Aspects 15-27.

Aspect 32: An apparatus for wireless communication, comprising at least one means for performing the method of one or more of Aspects 1-14.

Aspect 33: An apparatus for wireless communication, comprising at least one means for performing the method of one or more of Aspects 15-27.

Aspect 34: A non-transitory computer-readable medium storing code for wireless communication, the code comprising instructions executable by a processor to perform the method of one or more of Aspects 1-14.

Aspect 35: A non-transitory computer-readable medium storing code for wireless communication, the code comprising instructions executable by a processor to perform the method of one or more of Aspects 15-27.

Aspect 36: A non-transitory computer-readable medium storing a set of instructions for wireless communication, the set of instructions comprising one or more instructions that, when executed by one or more processors of a device, cause the device to perform the method of one or more of Aspects 1-14.

Aspect 37: A non-transitory computer-readable medium storing a set of instructions for wireless communication, the set of instructions comprising one or more instructions that, when executed by one or more processors of a device, cause the device to perform the method of one or more of Aspects 15-27.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors, coupled to the memory, configured to:
receive, from a base station, configuration information specifying similarity data to be provided in a Layer 1 (L1) report; and
transmit, to the base station and based at least in part on receiving the configuration information, the L1 report,
wherein the L1 report indicates a measure of similarity between a current condition of the UE and a past condition of the UE associated with a past event associated with the UE.

2. The UE of claim 1, wherein the past event is a beam failure recovery (BFR) event.

3. The UE of claim 1, wherein the L1 report comprises an L1-signal-to-interference plus noise ratio (L1-SINR) report.

4. The UE of claim 1, wherein the L1 report comprises an L1-reference signal received power (L1-RSRP) report.

5. The UE of claim 1, wherein the one or more processors are further configured to:
determine the measure of similarity based at least in part on one or more of:
a prior UE location associated with the past event, or
a prior UE signal measurement associated with the past event.

6. The UE of claim 5, wherein a manner of determining the measure of similarity depends on a type of the L1 report.

7. The UE of claim 5, wherein a manner of determining the measure of similarity is specified by the configuration information.

8. The UE of claim 1, wherein the L1 report includes an event index identifying the past event from a plurality of past events.

9. The UE of claim 8, wherein the event index begins from a most recent event of the plurality of past events.

10. The UE of claim 1, wherein the measure of similarity is based at least in part on at least one of a machine learning model or a neural network model.

11. The UE of claim 1, wherein the measure of similarity is indicated by 4 bits included in the L1 report, and an index identifying the past event is indicated by 2 bits included in the L1 report.

12. The UE of claim 1, wherein the measure of similarity is greater than other measures of similarity associated with other past conditions associated with other past events.

13. The UE of claim 1, wherein a first number of bits for an event index, and a second number of bits for the measure of similarity, are included in the configuration information.

14. The UE of claim 1, wherein the one or more processors are further configured to:
receive updated configuration information indicating an updated method of determining measures of similarity; and
determine an updated measure of similarity based at least in part on the updated method.

15. A base station for wireless communication, comprising:
a memory; and
one or more processors, coupled to the memory, configured to:
transmit, to a user equipment (UE), configuration information specifying similarity data to be provided in a Layer 1 (L1) report; and
receive, from the UE and based at least in part on transmitting the configuration information, the L1 report,
wherein the L1 report indicates a measure of similarity between a current condition of the UE and a past condition of the UE associated with a past event associated with the UE.

16. The base station of claim 15, wherein the past event is a beam failure recovery (BFR) event.

17. The base station of claim 15, wherein the L1 report comprises an L1-signal-to-interference plus noise ratio (L1-SINR) report.

18. The base station of claim 15, wherein the L1 report comprises an L1-reference signal received power (L1-RSRP) report.

19. The base station of claim 15, wherein the configuration information specifies a method of determining the measure of similarity.

20. The base station of claim 19, wherein the method of determining the measure of similarity indicates that the measure of similarity is to be based at least in part on one or more of:
a prior UE location associated with the past event, or
a prior UE signal measurement associated with the past event.

21. The base station of claim 19, wherein a manner of determining the measure of similarity depends on a type of the L1 report.

22. The base station of claim 19, wherein a manner of determining the measure of similarity includes using at least one of a machine learning model or a neural network model.

23. The base station of claim 15, wherein the L1 report includes an event index identifying the past event from a plurality of past events.

24. The base station of claim 23, wherein the event index begins from a most recent event of the plurality of past events.

25. The base station of claim 15, wherein the measure of similarity is indicated by 4 bits included in the L1 report, and an index identifying the past event is indicated by 2 bits included in the L1 report.

26. The base station of claim 15, wherein a first number of bits for an event index, and a second number of bits for the measure of similarity, are specified by the configuration information.

27. The base station of claim 15, wherein the one or more processors are further configured to:
transmit updated configuration information indicating an updated method of determining measures of similarity; and
receive an updated measure of similarity based at least in part on transmitting the updated configuration information.

28. A method of wireless communication performed by a user equipment (UE), comprising:
- receiving, from a base station, configuration information specifying similarity data to be provided in a Layer 1 (L1) report; and
- transmitting, to the base station and based at least in part on receiving the configuration information, the L1 report,
  - wherein the L1 report indicates a measure of similarity between a current condition of the UE and a past condition of the UE associated with a past event associated with the UE.

29. The method of claim 28, wherein the past event is a beam failure recovery (BFR) event.

30. A method of wireless communication performed by a base station, comprising:
- transmitting, to a user equipment (UE), configuration information specifying similarity data to be provided in a Layer 1 (L1) report; and
- receiving, from the UE and based at least in part on transmitting the configuration information, the L1 report,
  - wherein the L1 report indicates a measure of similarity between a current condition of the UE and a past condition of the UE associated with a past event associated with the UE.

* * * * *